US006807321B2

(12) United States Patent
Madsen

(10) Patent No.: US 6,807,321 B2
(45) Date of Patent: Oct. 19, 2004

(54) APPARATUS AND METHOD FOR MEASUREMENT AND ADAPTIVE CONTROL OF POLARIZATION MODE DISPERSION IN OPTICAL FIBER TRANSMISSION SYSTEMS

(75) Inventor: Christi Kay Madsen, South Plainfield, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 51 days.

(21) Appl. No.: 10/180,842

(22) Filed: Aug. 19, 2002

(65) Prior Publication Data

US 2003/0194166 A1 Oct. 16, 2003

Related U.S. Application Data

(60) Provisional application No. 60/363,397, filed on Mar. 11, 2002.

(51) Int. Cl.[7] .............................. G02B 6/00; G02B 6/36
(52) U.S. Cl. ......................................... 385/11; 398/183
(58) Field of Search ................................ 385/5, 11–17, 385/136, 147; 356/477, 491, 73.1; 398/147, 152, 183; 250/225, 227.17, 227.14

(56) References Cited

U.S. PATENT DOCUMENTS

| 6,020,584 A | * | 2/2000 | Brarens et al. | ......... 250/227.17 |
|---|---|---|---|---|
| 6,380,533 B1 | * | 4/2002 | Jopson et al. | ................ 250/225 |
| 6,385,356 B1 | * | 5/2002 | Jopson et al. | .................. 385/11 |
| 6,654,105 B2 | * | 11/2003 | Wang et al. | ................ 356/73.1 |
| 2002/0113972 A1 | * | 8/2002 | Rosenfeldt et al. | .......... 356/477 |
| 2003/0184735 A1 | * | 10/2003 | Kotten et al. | ............... 356/73.1 |
| 2003/0194166 A1 | * | 10/2003 | Madsen | ........................ 385/11 |

OTHER PUBLICATIONS

Tops. OFC'2001 Los Angeles, CA (MO6) vol. 54, "Chromatic and Polarization Mode Dispersion Measurement Technique using Phase–Sensitive Sideband Detection" C.K. Madsen, (no dated).

(List continued on next page.)

Primary Examiner—Akm Enayet Ullah

(57) ABSTRACT

In accordance with the invention, an optical fiber transmission system is provided with a new method and apparatus to measure PMD and then to use the measurements to control adaptive optical filters that minimize system signal degradation. The measurements provide accurate information to compensate for distortions and thereby permit higher transmission rates. The new technique can obtain phase information without optical heterodyning and without bandlimiting. In a first embodiment, an optical signal transmitter, such as a laser/modulator pair, is driven by a data signal combined with a test signal, in the form of a comb of tones with known relative magnitude and phase relationships. Tunable all pass filters recover phase and magnitude information to control an adaptive filter for precise compensation. In a second embodiment, no changes are made to the transmitted signal. The relative delay between orthogonal polarizations of a modulated signal can be obtained by using a polarization beam splitter (PBS), flipping (rotating by 90°) the polarization of one output, sweeping a narrowband optical filter (NBF) across the signal spectrum and detecting the interference between polarizations. Additional detectors can obtain the magnitude versus frequency for the orthogonal components, x and y.

20 Claims, 8 Drawing Sheets

OTHER PUBLICATIONS

Optics Letters– May 15, 1989, vol. 14. No. 10 "Measurement of polarization mode dispersion in single–mode fibers with random code coupling" 523–525 by C.D. Poole.

Group of Applied Physics, University of Geneva, Center for Telecommunication Studies and Pontifica Universita Catolica de Rio de Janiero , "How accurately can one measure a statistical quantity like Polarization Mode Dispersion?", N. Gisin, B. Gisin, J.P. Von der Weid, and R. Passy, p. 131–133.

Wireless Personal Communications 6: 1998–Kluwer Academic Publishers: "On Limits of Wireless Communications in a Fading Environment when Using Multiple Antennas", p. 311–335 by G.J. Foschini and M.J. Gans.

Electronics Letters, $7^{th}$ Jan. 1983, vol. 29, No. 1, "Simple Dispersion Measurement Technique with High Resolution,:" by B. Christensen, J. Mark, G. Jacobsen and E. Bediker, p. 132–134.

* cited by examiner

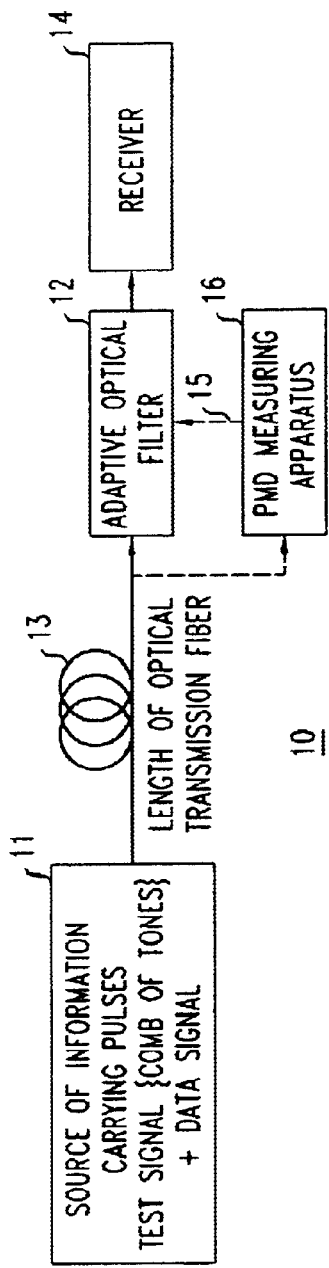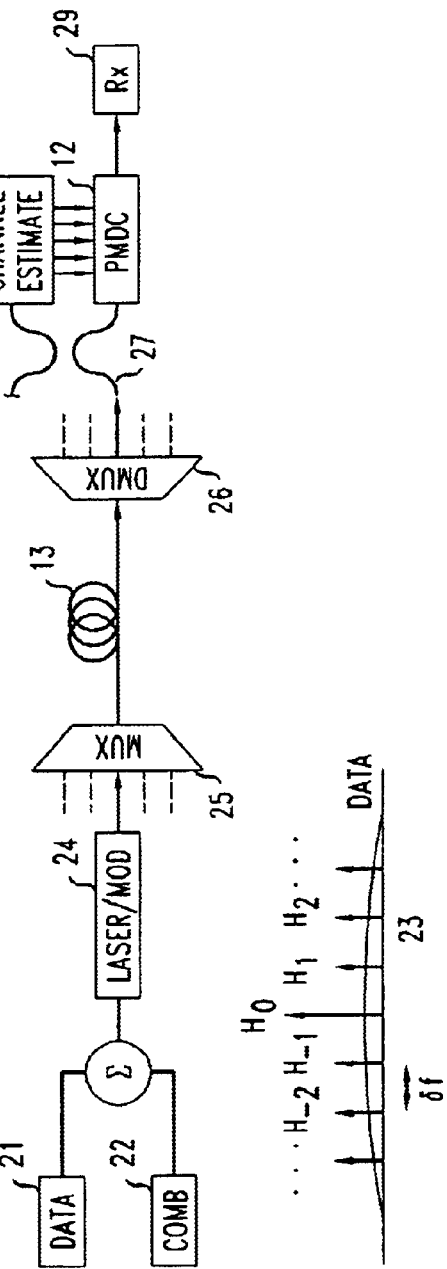

US 6,807,321 B2

APPARATUS AND METHOD FOR MEASUREMENT AND ADAPTIVE CONTROL OF POLARIZATION MODE DISPERSION IN OPTICAL FIBER TRANSMISSION SYSTEMS

CROSS REFERENCE TO RELATED APPLICATIONS

This application claims the benefit of U.S. Provisional Application Ser. No. 60/363,397, filed by the present inventor on Mar. 11, 2002, and entitled "Apparatus and Method for Measurement and Adaptive Control of Polarization Mode Dispersion in Optical Fiber Communication Systems", which is incorporated herein by reference.

FIELD OF THE INVENTION

This invention relates to optical fiber transmission systems, and in particular to an apparatus and method for measuring and controlling polarization mode dispersion in such systems.

BACKGROUND OF THE INVENTION

The measurement of optical signal parameters has taken on increased importance as digital communications migrates from copper and radio networks to optical fiber transmission systems. With the advent of wavelength division multiplexed optical fiber communication systems (WDM systems and dense WDM systems), fiber optic bandwidth is being used for the simultaneous transmission of many data channels at different optical frequencies.

Efficient fiber data transmission requires increasingly precise and high tolerance measurement of various optical parameters. One such parameter is polarization mode dispersion (PMD). Imperfections in fibers, particularly the long haul fibers, cause differing delays the orthogonal polarization components of an optical signal. These differing delays produce polarization mode dispersion (PMD) which can be distort the shape of transmitted signal pulses. PMD is of increasing concern at high bit rates, particularly at 40 Gb/s and above.

SUMMARY OF THE INVENTION

In accordance with the invention, an optical fiber transmission system is provided with a new method and apparatus to measure PMD and then to use the measurements to control adaptive optical filters that minimize system signal degradation. The measurements provide accurate information to compensate for distortions and thereby permit higher transmission rates. The new technique can obtain phase information without optical heterodyning and without band-limiting.

In a first embodiment, an optical signal transmitter, such as a laser/modulator pair, is driven by a data signal combined with a test signal, in the form of a comb of tones with known relative magnitude and phase relationships. Tunable all pass filters recover phase and magnitude information to control an adaptive filter for precise compensation.

In a second embodiment, no changes are made to the transmitted signal. The relative delay between orthogonal polarizations of a modulated signal can be obtained by using a polarization beam splitter (PBS), flipping (rotating by 90°) the polarization of one output, sweeping a narrowband optical filter (NBF) across the signal spectrum and detecting the interference between polarizations. Additional detectors can obtain the magnitude versus frequency for the orthogonal components, x and y.

BRIEF DESCRIPTION OF THE DRAWINGS

The advantages, nature and various additional features of the invention will appear more fully upon consideration of the illustrative embodiments now to be described in detail in connection with the accompanying drawings.

In the drawings:

FIG. 1 is a schematic diagram of an optical fiber transmission system using PMD measuring apparatus and an adaptive filter to reduce PMD;

FIG. 2 illustrates in greater detail the system of FIG. 1;

Figure 3:
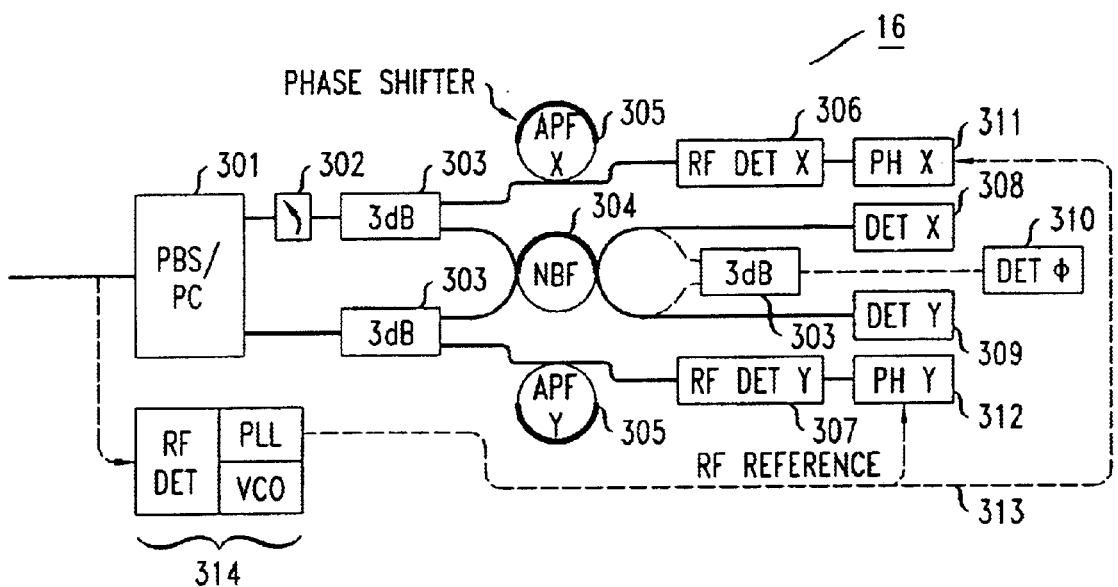
FIG. 3 schematically illustrates an exemplary PMD measuring apparatus.

It is to be understood that the drawings are for the purpose of illustrating the concepts of the invention, and except for the graphs, are not to scale.

DESCRIPTION

This description is divided into two parts. Part 1 describes the general nature of the invention and exemplary embodiments. Part II, written for those skilled in the art, describes in greater detail the theory underlying the invention.

I. Nature and Exemplary Embodiments

In accordance with the invention, an optical transmission system is provided with apparatus for measuring the phase and amplitude of polarization components. The measurements obtained can be used to characterize the PMD of channels and adjust tunable PMD compensators. Such compensation can permit higher rates of transmission.

Referring to the drawings, FIG. 1 schematically illustrates an optical transmission system 10 incorporating PMD minimization by PMD measurement and control. A source of information carrying pulses 11 provides a data signal and a test signal. The combined optical signal is transmitted via an optical fiber transmission path 13 to an adaptive optical filter 12. Downstream from the source, and preferably near the receiver 14 is PMD measuring apparatus 16. The measuring apparatus 16 measures the phase and magnitude of the polarization components, and generates a feedback signal along path 15 for controlling adaptive optical filter 12 to minimize system PMD.

FIG. 2 illustrates in greater detail the system of FIG. 1. The test signal 22 is added to the data signal 21 in the form of a comb of tones with known relative magnitude and phase relationships. The tones can be equally spaced. The spacing $\delta f$ between the tones may be on the order of 2.5 to 5 GHz. The tones provide test signal information with a higher SNR at the receiver than a pseudo-random bit sequence. There are many ways to add such a test signal 22, including modifying the data format such that tones with the desired frequency spacing appear in the output spectrum 23. The combined data signal and test signal is fed to a Laser/modulator combination 24 to generate a wavelength channel (as a channel in a wavelength division multiplexed (WDM) transmission system). The channel is combined with other channels in an optical multiplexer 25 to form a composite light signal. The composite light signal is then transmitted via optical transmission path 13. Demultiplexer 26, preferably at the downstream end of optical transmission path 13, separates the wavelength channels. Optical coupler 27 provides a wavelength channel to the polarization mode dispersion compensator (PMDC) 12 (the adaptive optical filter). Coupler 27 also provides light to the PMD measuring apparatus 16. The channel estimate made at PMD measuring apparatus 16 generates an adaptive PMD correction signal to control PMDC 12. Receiver (RX) 29 receives the compensated wavelength channel signal. The RF detectors (not shown in FIG. 2) of the channel estimate signal analyzer 16 need only have enough bandwidth to accommodate δf and not the whole signal bandwidth. The problem is to determine the relative phase between each pair of tones when they are all present at the detector.

Figure 4:
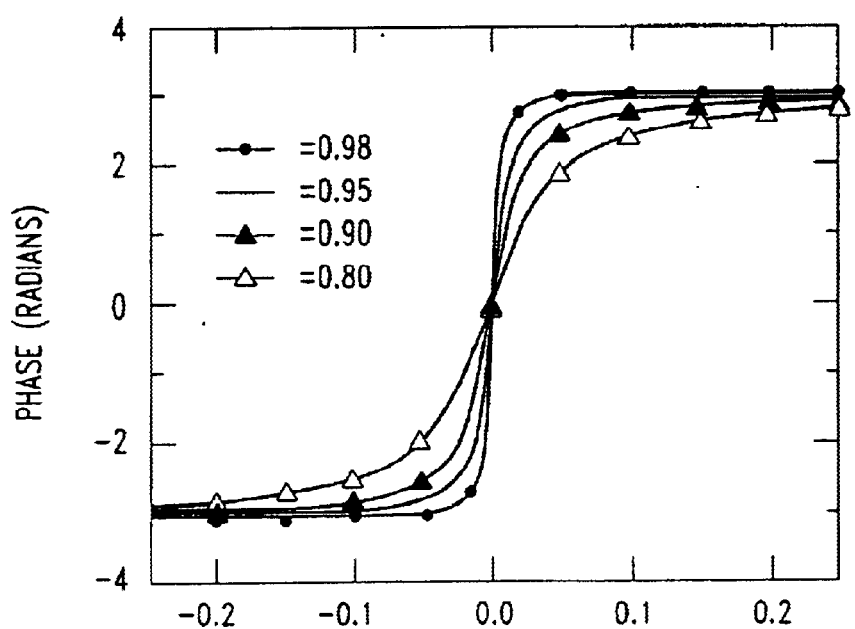
FIG. 4 shows the response of a single-stage all pass filter (APF) useful in understanding the apparatus of FIG. 3.

FIG. 3 schematically illustrates an exemplary measuring apparatus 16 for analyzing the test signal downstream. Each polarization is split into a separate path by a polarization beam splitter (PBS) and polarization controller (PC) 301. The PC allows the power in the x- and y-outputs to be controlled so that all of the power is not in one output or the other. One polarization of the output of the PBS/PC is flipped by 90° rotation 302 so that the outputs going into the 3 dB couplers 303 have the same polarization, i.e. either TE or TM. After the 3 dB coupler, one portion of each polarization is analyzed by a tunable narrowband filter (NBF) 304 to obtain the magnitude across the channel (detectors X 308, Y 309), and φ the relative phase between polarization (detector 310) derived via 3 dB coupler 303, while the other portion is transmitted through a tunable allpass filter (APF) 305 before being detected. Both polarizations see the same narrowband filter but in counterpropagating directions. The filters are tuned, for example, by thermo-optic phase shifters. The APF's are identical in principle, but any variations can be handled by calibration. Each APF is designed to provide a very sharp transition in its phase response from 0 to $2\pi$ near resonance as shown in FIG. 4. On-resonance, the phase is $\pi$. Off-resonance the phase is ideally 0 or $2\pi$. As the resonant frequency is shifted via a phase shifter in the feedback path, the phase response is translated across the channel spectrum and the RF detectors X 306 and Y 307 record different linear combinations of beats between adjacent tones. An RF reference 313 is obtained from a light signal tapped before the polarization beam splitter 301 and fed to an RF detector and phase locked loop incorporating a voltage controlled oscillator 314 to develop an RF reference signal 313. Blocks 311 and 312 measure the phase of the X and Y components as detected by 306 and 307 with respect to the RF reference 313.

In this approach, one ring is required per tone, so a minimum of three rings are desirable, one at the carrier and one for each sidetone. The detector bandwidth is kept as small as possible to minimize the complexity of the optical circuit. It is also desirable to arbitrarily increase the number of discrete frequencies at which measurements are made. This approach does not change the input polarization at the transmitter, but easily allows signal distortion information to be retrieved from polarization multiplexed signals.

Figure 10:
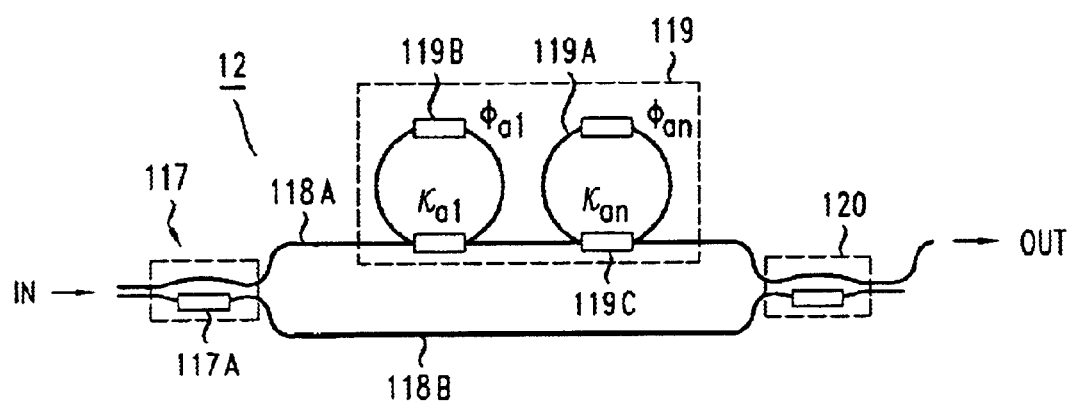
FIG. 10 schematically illustrates an exemplary adaptive filter.

FIG. 10 shows an adaptive filter (PMD compensator) 12 useful in the system of FIG. 1, to compensate polarization mode dispersion. The device 12 comprises, in essence, a polarization separating element 117 for coupling light of different polarizations to plural transmission subpaths 118A and 118B. At least one of the subpaths, e.g. 118A, is optically coupled to a tunable delay element 119 for compensating PMD. A polarization combining element 120 downstream of the delay element 119 combines the polarized beams in the subpaths to produce a compensated signal out.

In an advantageous form, the PMD compensator can be a polarization beam splitter (PBS) comprising a two-arm Mach-Zhender interferometer having a stress-applying silicon film 117A overlying a portion of at least one arm. The tunable delay element can be an all-pass filter comprising one or more ring resonators 119A that include phase shifters 119B. The resonators can be coupled to the subpath 18A by close adjacency or by gratings 119C. A signal from the PMD measuring apparatus 16 can be used to control PMD compensator via the phase shifters 119B. Further details concerning the structure and operation of the PMD compensator are set forth in applicant's co-pending U.S. application Ser. No. 10/131,438 filed Apr. 24, 2002 and entitled "Integrated Optical Dual Dispersion Compensator For Compensating Both Chromatic and Polarization Mode Dispersion." The 131,438 application is incorporated herein by reference.

Figure 5:
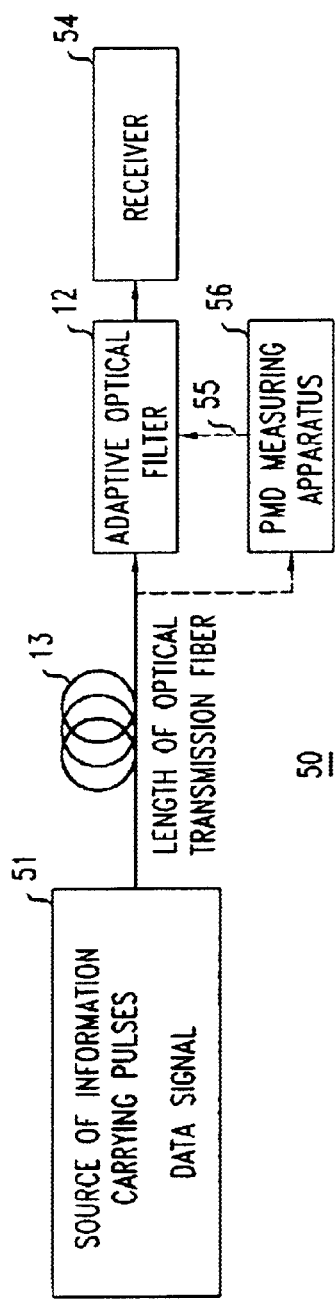
FIG. 5 is a schematic diagram of an alternative optical fiber transmission system using PMD measuring apparatus and an adaptive filter to reduce PMD.

FIG. 5 illustrates a second embodiment of an optical communication system 50 incorporating PMD minimization by PMD measurement and control. The optical data signal is transmitted from source 51 through transmission path 13 to adaptive optical filter 52. At the opposite end of optical transmission path 13, receiver 54, including PMD measuring apparatus 56, measures the phase and magnitude of the polarization components and generates a feedback signal along path 55 for controlling adaptive optical filter 12 to minimize system PMD.

Figure 6:
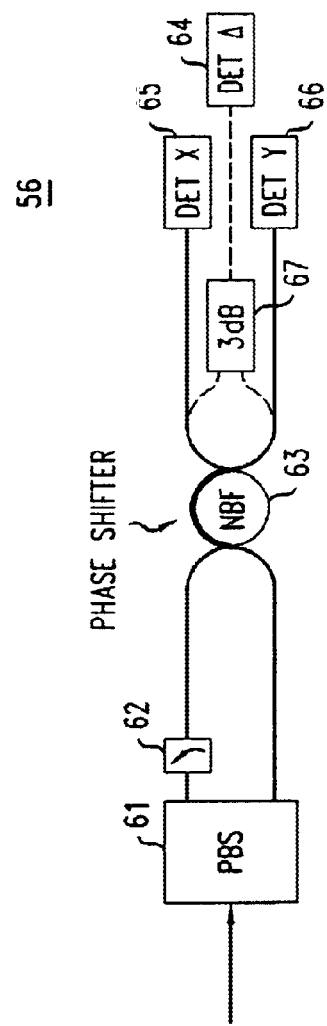
FIG. 6 schematically illustrates an alternative PMD measuring apparatus useful in the system of FIG. 5.

FIG. 6 shows a PMD measuring apparatus 56 useful in the embodiment of FIG. 5. The relative delay between orthogonal polarizations of a modulated signal is obtained by using a polarization beam splitter (PBS) 61, flipping the polarization of one output 62, sweeping a narrowband optical filter (NBF) 63 across the signal spectrum and detecting the interference between polarizations (Det Δ) 64 as derived from coupler 303. Additional detectors obtain the magnitude versus frequency for the orthogonal components, x 65 and y 66. Note that the detector bandwidth need only be sufficient to track the tuning speed of the NBF (sub-MHz). For a deterministic input signal, the detected power at the interference port is sinusoidal with a period that depends on the differential group delay ($\Delta\tau$) between the polarization components, $P_\Delta=(P_X+P_Y)/2+\sqrt{P_X P_Y}\cos(2\pi\Delta\tau f+\phi_O)$. The frequency f is relative to the optical carrier center frequency and $\phi_O$ is the relative phase between the polarizations at the center frequency.

The invention may now be more clearly understood by consideration of the following specific example.

EXAMPLE

Figure 7A:
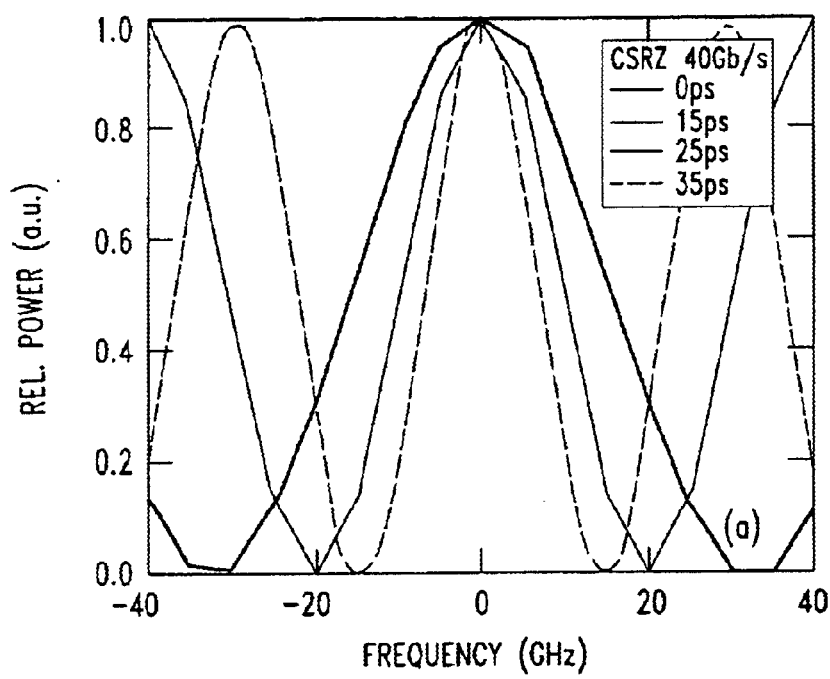
FIGS. 7, 8 and 9 are graphical illustrations presenting the results of a computer simulation of a transmission system in accordance with the invention.
Figure 7B:
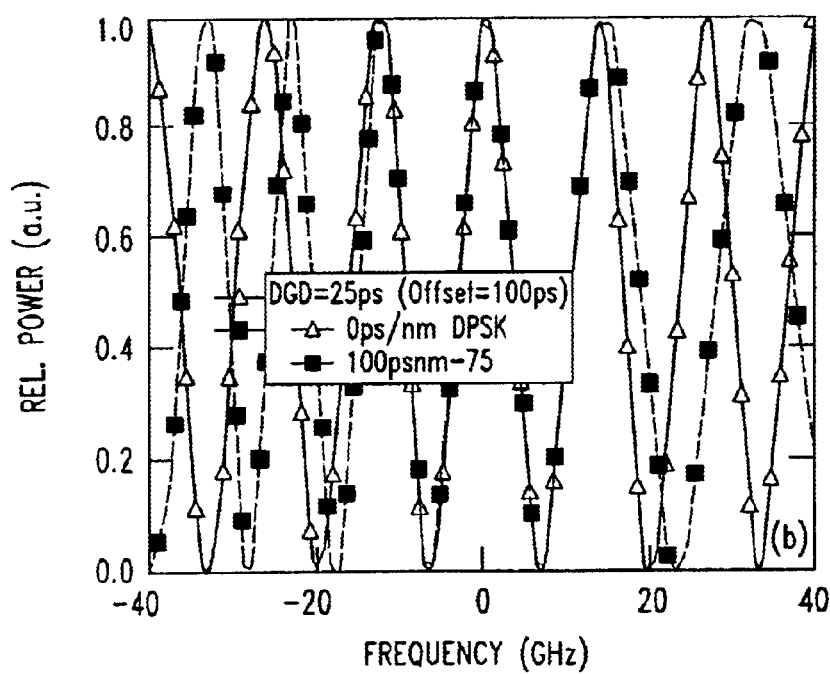

The results of simulation using this technique are shown in FIG. 7A for a 40 Gb/s carrier-suppress return-to-zero (CSRZ) signal with the same random, 128-bit sequence for each measurement point. The power at each frequency was normalized by the total power, Px+Py. This technique relies on the interference of orthogonal polarization components. An additional delay may be introduced for one polarization, relative to the other, to decrease the period of the interference pattern and allow a course, frequency-dependent relative delay to be obtained. The additional delay also allows one to determine which component has the longest delay by whether the period increased or decreased relative to the offset value. An offset of 100 ps and a system DGD of 25 ps are simulated in FIG. 7B with a 40 Gb/s (differential phase shift keying) DPSK signal using commercially available software (VPI TransitionMaker). For curve 75, a dispersion of 100 ps/nm was introduced on one polarization, which chirps the interference pattern. By locally fitting the interference pattern, the chirp can be extracted. In this simulation, the relative phase was extracted to within 1 ps. A Gaussian optical bandpass filter with 1 GHz bandwidth was used in the simulations and the same bit pattern for each measurement point.

Figure 8A:
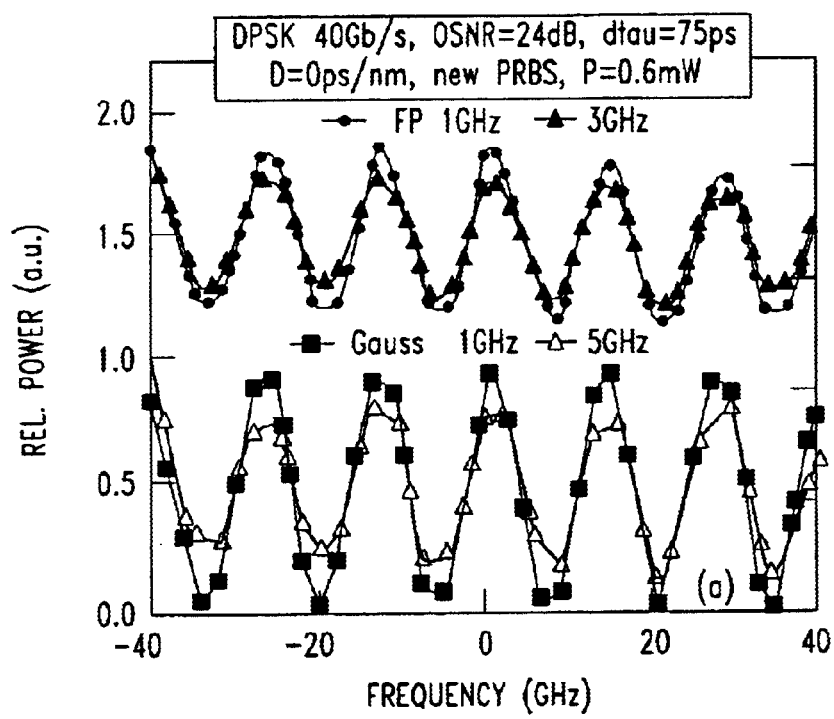
Figure 8B:
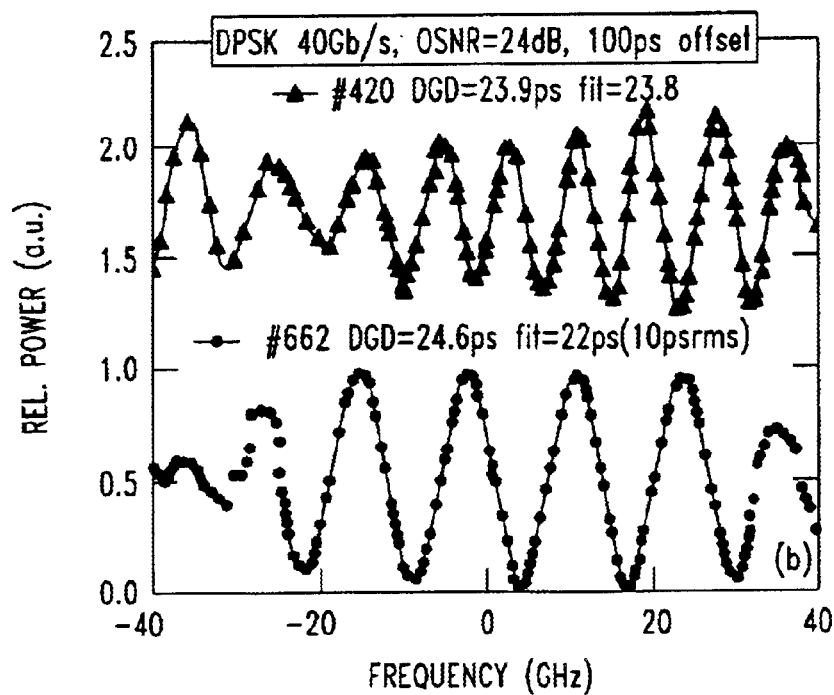
Figure 8C:
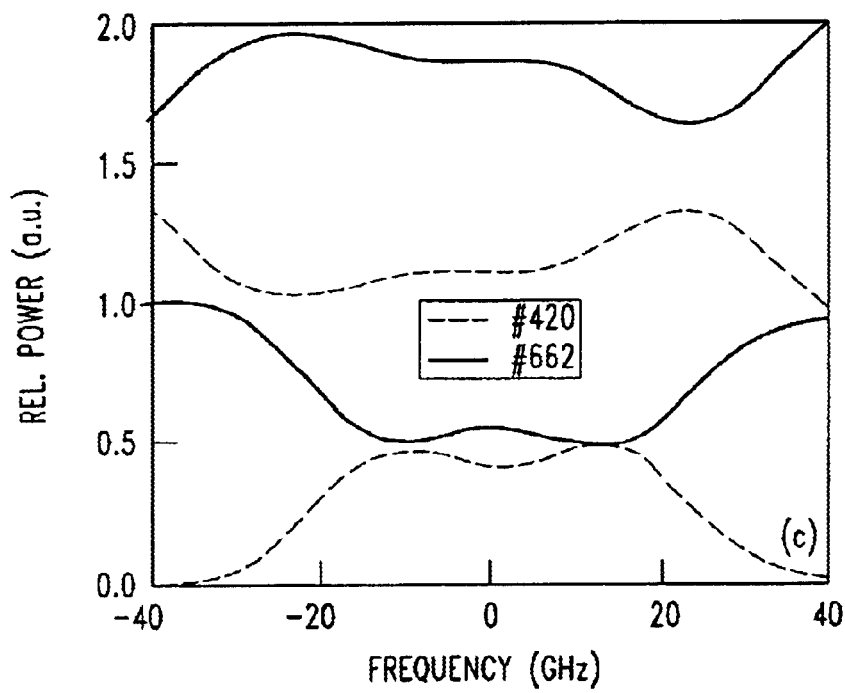
Figure 8D:
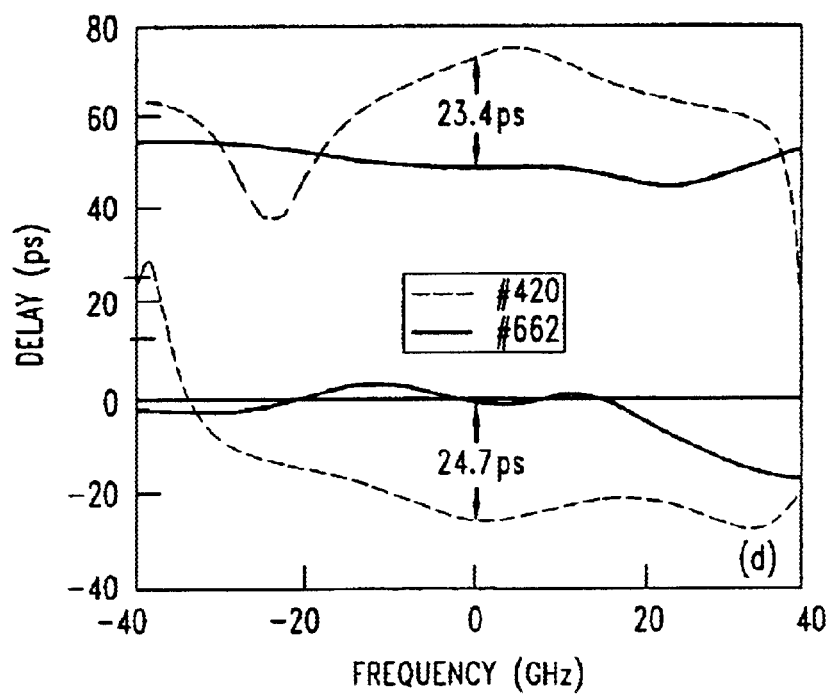

To explore the impact of noise and random bit patterns between measurements, a signal power of 0.05 Mw was input to an optical amplifier to produce an OSNR of 24 dB before the DGD source and different, random bit patterns were used for each measurement. The interference patterns obtained for a Gaussian filter with 1 and 5 GHz bandwidth are shown in FIG. 8A and compared against results for a lossless Fabry-Perot filter with a 1 GHz and 3 GHz bandwidth and FSR=200 GHz. A good fit is obtained even with the noisy signal. At first glance, the offset delay would appear to cause each bit to interfere with a different one depending on the delay; however, the NBF spreads each pulse out in time (i.e. convolves with a long impulse response) so that it interferes with itself. By decreasing the filter width, the interference pattern for a larger relative delay can be measured. To illustrate the effectiveness of this technique for PMD-distorted signals, two synthesized data sets of a fiber with 10 ps RMS DGD were used instead of a frequency-independent DGD source with the results shown in FIG. 8B. The amplitude of the orthogonal components is also frequency dependent as indicated by the amplitude variation of the interference pattern. The results show a clear interference pattern whose fit agrees well with the differential delay between orthogonal polarization components of the data set. The magnitude and delay associated with the PMD data sets are shown in FIG. 8C and FIG. 8D for a direct comparison to the interference pattern results.

It now can be seen that the invention is an optical fiber transmission system for transmitting an optical signal with reduced polarization mode dispersion (PMD) along an optical transmission path subject to PMD. The system comprises a source of at least one optical signal, an optical fiber transmission path optically coupled to the source for transmitting the signal and a PMD measuring device optically coupled to the path downstream of the source for providing a measure signal indicative of the PMD induced change in the different polarization components of the signal. A tunable PMD compensating device responsive to the measure signal compensates PMD in the optical signal.

In an advantageous embodiment, the tunable PMD compensating device comprises a polarization beam splitter optically coupled to the transmission path for splitting the optical signal into different polarization components onto respectively different optical subpaths. At least one tunable delay element on at least one subpath is provided to compensate PMD-induced phase difference between the polarization components. Preferably the tunable delay element is a tunable optical ring resonator.

The PMD measuring device advantageously comprises a polarization beam splitter optically coupled to the transmission path for splitting the optical signal into different polarization components onto respectively different optical subpaths. A polarization rotator is provided on at least one subpath for converting the signals on the subpaths to the same polarization, and at least one detector is coupled to the subpaths for detecting the signals on the different subpaths.

Preferably the signals on the respective subpaths are coupled to the detector by a sweeping filter such as a tunable optical ring resonator.

The PMD measuring device can measure the PMD in the data signal from the source or it can measure the PMD in a test signal having polarization components of known phase and magnitude. The data signal advantageously comprises WDM optical signals, and the test signal is advantageously a comb test signal composed of plural discrete wavelength bands.

By tapping the optical signal upstream of the polarization beam splitter, an RF detector connected to the tap can provide the electrical test signal to a phase locked loop (PLL). The PLL comprises a voltage controlled oscillator and can generate an electrical reference signal.

The subpaths can be further split to provide a portion of each subpath optical signal to a tunable resonant filter. The tunable resonant filter can be connected to an RF detector for extracting the electrical test signal from the subpath optical signal. A phase detector connected to the RF detector and the electrical reference signal can then measure the phase between the electrical test signal and the electrical reference signal.

The tunable resonant filter can be an all pass filter. The filter can have an off-resonance response of 0 or $2\pi$, and it can have an on-resonance response $\pi$. The tunable resonant filter can be simultaneously tuned with the first resonant filter.

The test signal comb tone wavelength can be detected by a magnitude peak at the output of the first filter to trigger a measurement of the phase between the electrical test signal and the electrical reference signal at the tone wavelength.

II. Underlying Theory

This section present's applicant's best current understanding of the theory underlying measurement of PMD by use of all pass filtering.

The theoretical basis for measurement of PMD by use of all pass filtering.

In linear systems terms, we assign the transmission channel a complex frequency response H(f) which we wish to measure at discrete points defined by the tones. For simplicity, let the tone amplitudes and phases be equal at the transmitter. The response of the system at the $n^{th}$ tone is designated by $$H_n = h(n\delta f) = h_n e^{j(n\delta\omega\tau + \Phi_n)}$$

which consists of an amplitude and phase term $h_n$ and $\phi_n$. The allpass filter adds an additional phase term, call it $\theta_n$. When detected and mixed with a reference signal at the tone frequency, and after low-pass filtering to retain just the $\delta f$ mixing terms, the in-phase and quadrature components are given by $$i = \sum_{n=-N}^{N-1} h_n h_{n+1} \cos(\Delta\varphi_{n+1} + \Delta\theta_{n+1})$$

$$q = \sum_{n=-N}^{N-1} h_n h_{n+1} \sin(\Delta\varphi_{n+1} + \Delta\theta_{n+1})$$

where:

$$\Delta\varphi_{n+1} = \varphi_{n+1} - \varphi_n \text{ and } \Delta\theta_{n+1} = \theta_{n+1} - \theta_n$$

In the ideal case of a lossless APF whose pole approaches unity, $\Delta\theta_n$, is equal to 0 or $\pi$ and the amplitude response is unity. The phase response for a single-stage APF at several values of the pole magnitude r is shown in FIG. 3.

As the APF response is tuned across the tones, the detected i and q change. Consider a case with three tones. For the first measurement, the APF resonant frequency is set out-of-band, so $\Delta\theta_0=\Delta\theta_1=0$ and the quadrature components are:

$$i_1 = h_{-1}h_0 \cos(\Delta\phi_0) + h_0 h_1 \cos(\Delta\phi_1)$$

$$q_1 = h_{-1}h_0 \sin(\Delta\phi_0) + h_0 h_1 \sin(\Delta\phi_1)$$

For the second measurement, the resonant frequency is set at $f_0 - \delta f$ so that $\Delta\theta_0 = \pi$ and $\Delta\theta_1 = 0$.
Then, the quadrature components are:

$$i_2 = -h_{-1}h_0 \cos(\Delta\phi_0) + h_0 h_1 \cos(\Delta\phi_1)$$

$$q_2 = -h_{-1}h_0 \sin(\Delta\phi_0) + h_0 h_1 \sin(\Delta\phi_1)$$

Thus, $h_0 h_1 \cos(\Delta\phi_1) = (i_1+i_2)/2$ and $h_{-1}h_0 \cos(\Delta\phi_1) = (i_1-i_2)/2 \cos(\Delta\phi_1)/2$, and similarly for the q components so that $$\Delta\varphi_1 = \tan^{-1}\left[\frac{q_1+q_2}{i_1+i_2}\right] \text{ and } \Delta\varphi_0 = \tan^{-1}\left[\frac{q_1-q_2}{i_1-i_2}\right].$$

By detecting i and q at 2N positions of the APF, two matrix equations result, i=Ax and q=Ay, which can be solved to yield $x=\{h_n h_{n+1} \cos(\Delta\phi_{n+1})\}$ and $y=\{h_n h_{n+1} \sin(\Delta\phi_{n+1})\}$ where $A=\{\cos(\Delta\theta_{mn})\}$ and $-N \leq n,m \leq N-1$. Note that the elements of A for this ideal case are either 1 or −1 and that the arctangent of y/x yields the desired relative phase information. In the ideal three-tone case, $$A = \begin{bmatrix} 1 & 1 \\ -1 & 1 \end{bmatrix}.$$

Once the magnitude response is determined independently at one frequency, then the x (or y) vector can provide the remaining magnitude values. The APFs provide a functionality that would otherwise have to be obtained by separating the tones into separate paths (i.e. demultiplexing closely spaced tones) and using a phase shifter in each path to obtained the desired series of linear combinations. Note that only the resonant frequency is tuned for both the NBF and APFs, so the coupling ratios are fixed. This allows simple waveguide layouts for the rings, which can achieve very low roundtrip losses. An underlying assumption is that the APF can be translated over 2N points in a time short compared to changes in the system response. With typical thermo-optic phase shifters, the tuning speed is in the ms range and further modifications are possible to reduce that by one to two orders of magnitude. An advantage of working with δf's in the range of wireless carrier frequencies, such as 2.5 GHz, is that low cost RF signal processing chips are available such as gain and phase measurement circuits. By synchronizing the sweep of the NBF and APFs, the location of the tones in the magnitude response can be used to trigger the sampling of i and q. While simultaneous measurement of orthogonal polarizations is shown in FIG. 3, this may not be required for all applications. An additional measurement easily implemented in planar waveguides is the relative phase between polarizations, which is indicated by the Det φ in FIG. 3. The measurement of relative phase and magnitude provides the complete Jones vector at each tone. For polarization multiplexed signals, a slightly different comb frequency difference δf is used for each polarization and is retrieved by mixing with the appropriate local oscillator after detection.

The PMD in a system can be described by its Jones matrix. In the simplified case of a lossless system, $$M(\omega) = \begin{bmatrix} U(\omega) & -V^*(\omega) \\ V(\omega) & U^*(\omega) \end{bmatrix}$$

where $U(\omega)$ and $V(\omega)$ are complex transfer functions for each orthogonal polarization. Let the Jones vector at the input for each polarization be denoted by $S_X=[S_X(\omega)\ 0]^T$ and $S_Y=[0\ S_Y(\omega)]^T$ where $S(\omega)$ is the input spectrum. The output, measured by a circuit such as shown in FIG. 3, is then given by $H=M(S_X+S_Y)$ where $H=[H_X(\omega)\ H_Y(\omega)]^T$, $H_X(\omega)=U(\omega)S_X(\omega)-V^*(\omega)S_Y(\omega)$, and $H_Y(\omega)=V(\omega)S_X(\omega)-U^*(\omega)S_Y(\omega)$. Thus, it is possible to measure the system Jones matrix with this technique without varying the input polarization to the system. For PMD compensation, this provides the information needed to estimate the desired compensating function, $M^{-1}(\omega)$.

Figure 9A:
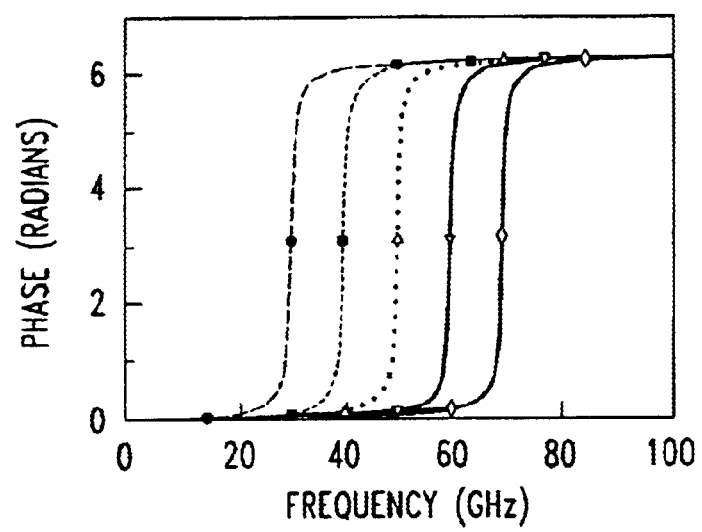
Figure 9B:
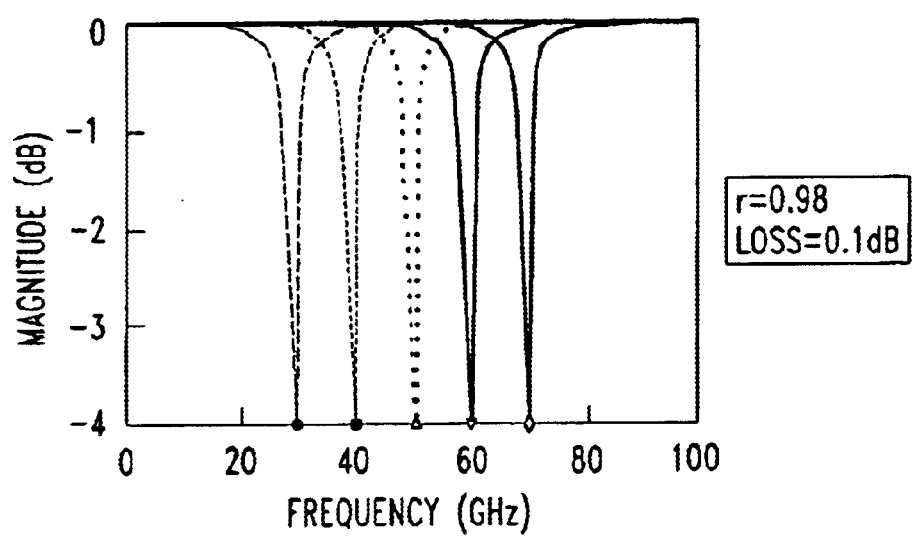

With practical APFs, the pole has a value less than unity, causing the phase to vary more gradually across the resonant frequency region, and the feedback path has some loss, which produces a frequency dependent amplitude response as shown in FIG. 4. The elements of A are no longer 1 or −1. The non-idealities of the APF are now included in matrix equations given by i=Ax+By and q=Ay+Bx where $A=\{a_n a_{n+1} \cos(\Delta\theta_{mn})\}$, $B=\{a_n a_{n+1} \sin(\Delta\theta_{mn})\}$ and the magnitude response of the APF at the tone frequencies is represented by the $a_n$. Note that A and B depend only on the APF response and not the system, so they can be determined by a one-time calibration procedure. The solution is given by $y=-(A+BA^{-1}B)^{-1}(q+BA^{-1}i)$ and $x=A^{-1}(i+By)$. The requirement for the tunable APF is that it sample the tones in a manner so that the rows of A are independent and A is invertible. This condition is certainly met with non ideal, but practical, parameters for the APF as shown in FIG. 9A (phase) and FIG. 9B (magnitude) of 0.1 dB/roundtrip and the pole at 0.95.

What is claimed:

1. An optical fiber transmission system for transmitting an optical signal with reduced polarization mode dispersion (PMD) along an optical transmission path subject to PMD comprising:

an optical source of at least one optical signal;

an optical fiber transmission path optically coupled to the source for transmitting the signal;

a PMD measuring device optically coupled to the path downstream of the source for providing a measure signal indicative of the PMD-induced change in different polarization components of the signal; and a tunable PMD compensating device tunably responsive to the measure signal for compensating PMD in the optical signal.

2. The system of claim 1 wherein the tunable PMD compensating device comprises a polarization beam splitter optically coupled to the transmission path for splitting the signal into different polarization components onto respectively different optical subpaths and a tunable delay element on at least one subpath to compensate PMD.

3. The system of claim 2 wherein the tunable delay element comprises at least one tunable optical ring resonator.

4. The system of claim 1 wherein the PMD measuring device comprises:

a polarization beam splitter optically coupled to the transmission path for splitting the optical signal into different polarization components onto respectively different optical subpaths;

a polarization rotator on at least one subpath for converting the signals on the respective subpaths to the same polarization;

a first filter for sweeping across a band of wavelengths; and at least one detector coupled to the output of the filter for detecting the relative phase or magnitudes of the signals on the different subpaths.

5. The system of claim 4 further comprising at least one tunable filter optically coupled to the subpaths upstream of the detector.

6. The system of claim 4 wherein the signals on the respective subpaths are coupled to the detector by a tunable filter.

7. The system of claim 6 wherein the tunable filter comprises a tunable optical ring resonator.

8. The system of claim 4 wherein the optical source comprises a data signal and the PMD measuring device measures the PMD-induced change in polarization components of the data signal.

9. The system of claim 1 wherein the optical source comprises a source of WDM optical signals.

10. The system of claim 1 wherein the optical source comprises a source of a comb test signal composed of plural discrete wavelength bands.

11. The system of claim 4 wherein the optical source comprises a source of data signals and a test signal having polarization components of known magnitude and phase difference, and the PMD measuring device measures the PMD-induced change in the test signal polarization components.

12. The system of claim 11 further comprising:

an optical tap at the input to the polarization beam splitter for providing a sample of the input signal;

an RF detector responsive to the sample to detect the test signal;

a phase locked loop locked to the phase of the detected RF test signal to generate an electrical reference signal.

13. The system of claim 12:

wherein each subpath comprises a splitter for coupling a portion of the subpath optical signals into a tunable resonant filter;

an RF detector optically coupled to the filter for extracting an electrical test signal from the optical signal; and, a phase detector electrically coupled to the RF detector for comparing the phase of the electrical test signal to the electrical reference signal.

14. The system of claim 13 wherein the tunable resonant filter is an all pass filter.

15. The system of claim 13 wherein the tunable resonant filter has a transition in phase response near resonance and a known phase shift at resonance.

16. The system of claim 13 wherein the tunable resonant filter has a phase response off resonance of 0 or $2\pi$.

17. The system of claim 13 wherein the tunable resonant filter has an on resonance phase response of $\pi$.

18. The system of claim 13 wherein the tunable resonant filter and the first filter are simultaneously tunable.

19. The system of claim 17 wherein the test signal comprises a test signal comb of tones.

20. The system of claim 19 wherein the detection of a magnitude peak at the first filter at a tone triggers a measurement of the phase between the electrical test signal and the electrical reference signal.

* * * * *